United States Patent
Fisher

[11] 3,722,190
[45] Mar. 27, 1973

[54] CONDITIONER ROLL MOUNTING MEANS AND CUSHIONING STOP SYSTEM THEREFOR

[75] Inventor: Ivan E. Fisher, Mankato, Minn.

[73] Assignee: Owatonna Manufacturing Company, Inc., Owatonna, Minn.

[22] Filed: July 14, 1972

[21] Appl. No.: 272,011

[52] U.S. Cl. .................................................. 56/1
[51] Int. Cl. ............................................. A01d 47/00
[58] Field of Search ............... 56/1, DIG. 1, 14.4, 288

[56] References Cited

UNITED STATES PATENTS

| | | | |
|---|---|---|---|
| 1,473,863 | 11/1923 | Pelton et al. | 56/288 |
| 2,711,622 | 6/1955 | Cunningham | 56/DIG. 1 |
| 2,843,990 | 7/1958 | Coultas | 56/DIG. 1 |
| 2,963,841 | 12/1960 | Cunningham | 56/DIG. 1 |
| 3,014,324 | 12/1961 | McCarty | 56/DIG. 1 |
| 3,101,578 | 8/1963 | Johnston | 56/DIG. 1 |
| 3,128,586 | 4/1964 | Johnston | 56/DIG. 1 |
| 3,339,352 | 9/1967 | Burrough et al. | 56/DIG. 1 |

Primary Examiner—Russell R. Kinsey
Attorney—Ralph F. Merchant et al.

[57] ABSTRACT

A pair of superposed parallel crop conditioner rolls, one journaled in a frame on a fixed axis, the other mounted for generally upward and downward movements toward and away from the one roll. Springs yieldingly urge the moveable roll towards the fixedly positioned roll, and stop elements limit movement of the moveable roll toward the fixedly positioned roll. Adjustment mechanism positions the moveable roll generally forwardly or rearwardly relative to a position vertically spaced from the axis of the fixedly positioned roll.

8 Claims, 5 Drawing Figures

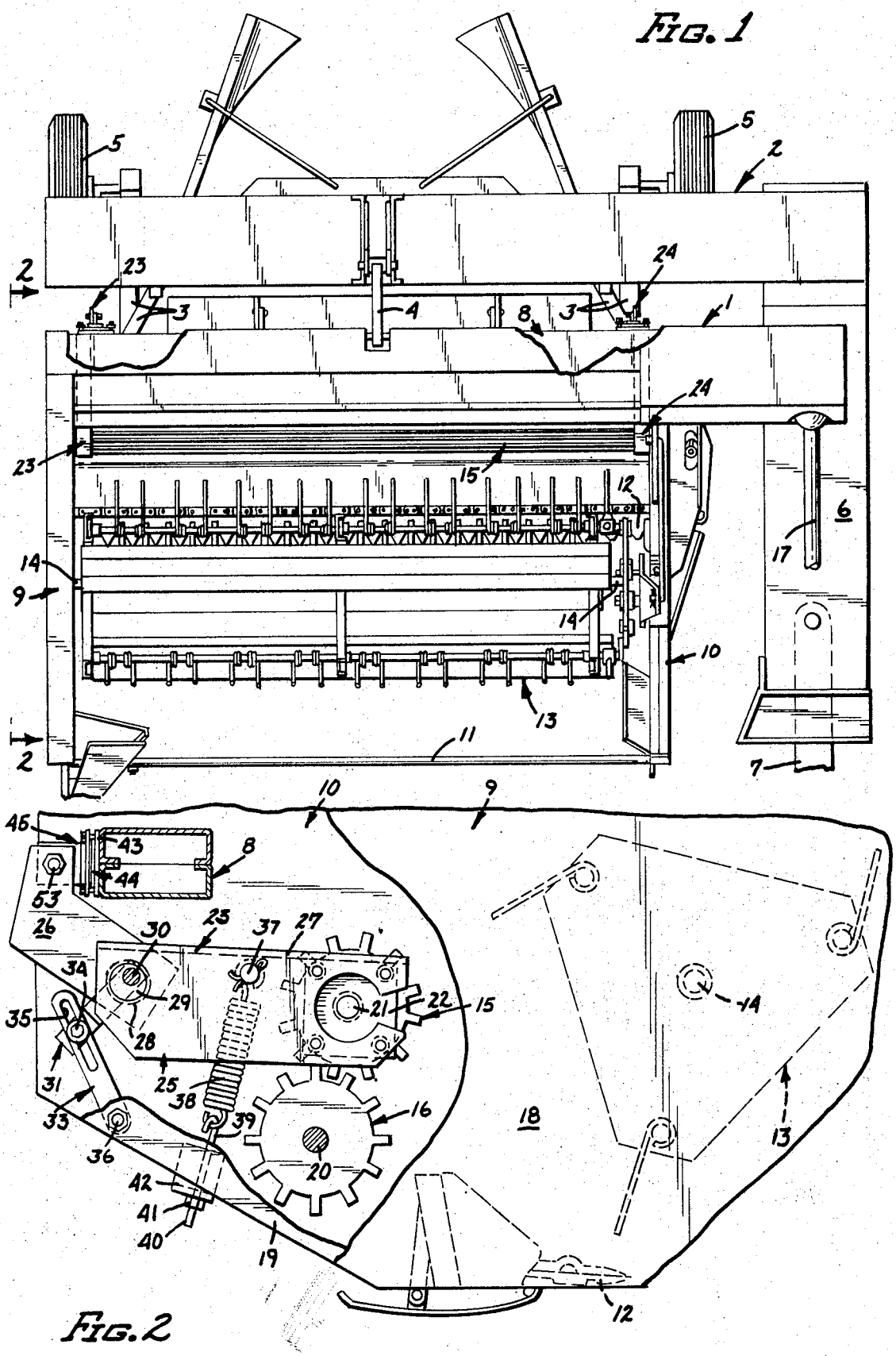

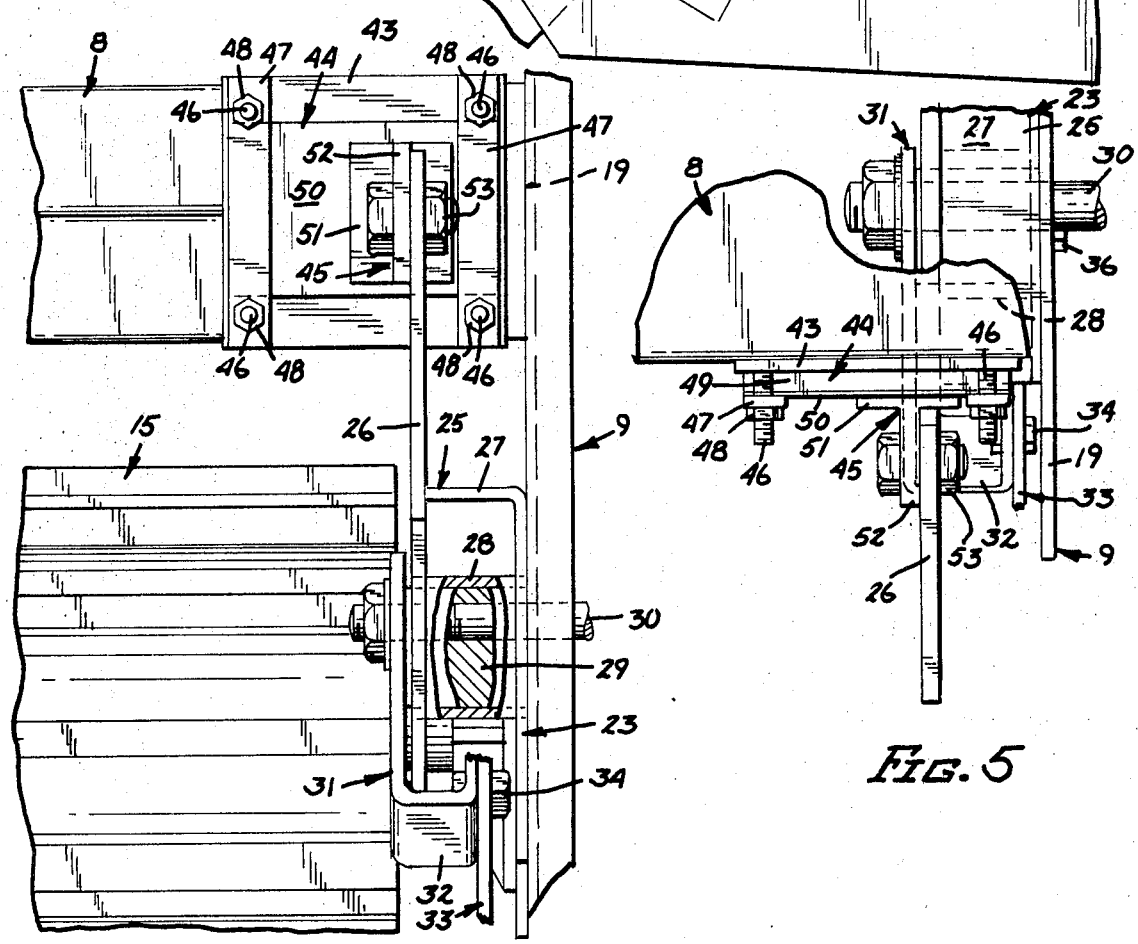

CONDITIONER ROLL MOUNTING MEANS AND CUSHIONING STOP SYSTEM THEREFOR

BACKGROUND OF THE INVENTION

This invention relates to improvements in the mounting of crop conditioner rolls in harvesting apparatus of the type generally disclosed in U.S. Pat. No. 2,711,622, to Cunningham; 2,843,990, to Coultas; and 2,908,126, to Dyrdahl; and more particularly to mounting and adjusting means whereby the direction of discharge of material from the conditioner rolls may be varied. This invention further relates to a roll mounting apparatus permitting separation and repositioning of the rolls when clumps of crop material are fed to the conditioner rolls.

SUMMARY OF THE INVENTION

An important object of this invention is the provision of conditioner roll mounting structure which permits quick and easy adjustment of one roll relative to its cooperating roll.

Another object of this invention is the provision of a conditioner roll mounting structure wherein one of the rolls is yieldingly urged toward operative engagement with its cooperating roll and moveable away from such engagement responsive to feeding of heavy clumps of crop material to the rolls.

Another object of this invention is the provision of an adjustable stop arrangement which limits movement of one roll toward the other and which includes a cushion for stopping such movement.

Yet another object of this invention is the provision of adjustable arrangements as set forth, which are of easy access to the operator of the apparatus.

To these ends, I provide, in a mower and conditioner including a pair of crop conditioner rolls, a pair of mounting arms each having bearings at one end journaling an opposite end of one of the conditioner rolls. At their opposite ends, the arms are pivotally secured to the mower and conditioner frame structure on axes parallel to the axis of the roll carried by the arms, for swinging movements of the arms to carry the roll toward and away from the other roll which is journaled on a fixed axis in the frame structure. The arm mountings are provided with eccentric elements for adjustment of the arm carried roll in directions generally tangential to the other roll to vary the angle of discharge of conditioner crop material from the rolls.

The roll mounting arms have portions provided with abutment members that abuttingly engage pads mounted on a transverse frame member of the mower and conditioner structure, the pads limiting movement of the arm mounted roll toward the other roll, the pads having elastic cushioning elements and shims. The cushioning elements absorb shock loads on the moving roll when clumps of crop material have passed between the rolls, and the arm carried roll is spring impelled toward the other roll. The shims provide for adjustment of the limit of movement of the arm carried roll toward the other roll. The pads and eccentric adjustment portions are disposed at the rear portion of the machine to be easily accessible for adjustment by the operator.

DESCRIPTION OF THE DRAWINGS

FIG. 1 is a fragmentary view in top plan of a conventional mower and crop conditioner embodying the present invention, some parts being broken away;

FIG. 2 is an enlarged fragmentary view in end elevation, as seen from the line 2—2 of FIG. 1, and rotated 90 degrees;

FIG. 3 is an enlarged fragmentary view corresponding to a portion of FIG. 2;

FIG. 4 is an enlarged fragmentary view in end elevation, as seen from the left to the right with respect to FIG. 2, some parts being broken away and some parts being shown in section; and FIG. 5 is a fragmentary view in top plan of the structure of FIG. 4, some parts being broken away and some parts being shown in section.

DETAILED DESCRIPTION OF THE PREFERRED EMBODIMENT

A commercially available mower or swather is shown particularly in FIGS. 1 and 2 as comprising a frame structure including front and rear frames 1 and 2 respectively connected by frame members 3 and 4, and supported by a pair of laterally spaced tire-equipped wheels 5. The front and rear frame members 1 and 2 are further connected by an end frame member 6 that is adapted to be connected to the drawbar of a tractor, not shown, by means of a hitch bar 7. The front frame 1 includes an elongated transverse frame member 8, to opposite ends of which are rigidly connected a pair of end frame members 9 and 10 which extend forwardly from the transverse frame member 8 and which are connected at their front ends by a rigid tie bar 11. The end frame members support a conventional cycle-bar mower 12 and journal a tine-equipped reel 13 having axial shafts 14. The swather further includes a pair of cooperating upper and lower crop conditioner rolls 15 and 16 disposed in superposed parallel relationship between the end frame members 9 and 10, and positioned to receive crop, such as hay, that is cut by the mower structure 12 and fed upwardly and rearwardly by the tines of the reel 13. The apparatus thus far described does not in and of itself comprise the instant invention. Hence, further detailed description thereof is believed unnecessary, and is omitted in the interest of brevity. It should suffice to state that the mower 12, reel 13 and conditioner rolls 15 and 16 are preferably driven from the power take-off of the tractor, not shown, through power transmission mechanism including a drive shaft 17. Further, it may be assumed that the rear frame 2 is disposed at a level below that of the transverse frame member 8.

As shown in FIG. 2, the end frame member 9 comprises outer and inner walls 18 and 19 respectively, the adjacent end of the transverse member 8 being welded or otherwise rigidly secured to at least the inner wall 19. In like manner, the opposite end of the transverse frame member 8 is welded or otherwise rigidly secured to the end frame member 10. The lower conditioner roll 16 is provided at its opposite ends with axially projecting shafts 20 that are journaled in suitable bearings in the end frame members 9 and 10 on a fixed axis, these bearings not being shown. Further, only one of the axial shafts 20 are shown, see FIG. 2.

The upper conditioner roll 15 is provided at its opposite ends with axial shafts 21, one of which is shown, see FIG. 2. The shafts 21 are journaled in bearings 22 that are each secured to one end of a pair of mounting or supporting arms 23 and 24. Except for the fact that one of the arms 23 and 24 is left-hand and the other is right-hand, these arms are identical in structure. Hence, only the arm 23 is shown in FIGS. 2–5 and described in detail. As therein shown, the arm 23 comprises a pair of cooperating arm sections 25 and 26 that are welded together, the arm section 25 having a transverse flange 27 the outer edge of which is welded to the arm section 26. Below the flange 27, a tubular spacer 28 extends through aligned openings in the arm sections 25 and 26, and is welded therein. An eccentric element 29 is journaled in the tubular spacer 28, and is journaled on a mounting bolt 30 that is rigidly mounted in the end frame member 9. The bolt 30 is disposed parallel to the axis of the eccentric element 29 and eccentric thereto, see particularly FIGS. 2–4. A radial arm 31 is welded to one end of the eccentric element 29, the opposite end of the arm 31 being U-shaped, as indicated at 32, the U-shaped end portion 32 being releasably locked to an anchoring arm 33 by a nut-equipped machine screw or the like 34 extending through a suitable aperture in the U-shaped end portion 32 and an elongated slot 35 in the anchoring arm 33. The anchoring arm 33 is suitably secured to the end frame wall 19 by a nut-equipped bolt or like fastening means 36.

Bearing in mind that the eccentric mounting arrangement described above in connection with the arm 23 is also present in connection with the arm 24, it will be seen that, by rotating the eccentrics 29 about the axes of the bolts 30, the arms 23 and 24 are moved bodily forwardly or rearwardly so that the upper conditioner roll 15 moves in opposite directions generally tangentially of the lower conditioner roll 16. By thus adjusting the position of the upper roll 15, the direction in which material is discharged rearwardly between the rolls 15 and 16 may be raised or lowered, as desired.

Each of the arms 23 and 24 is provided with a transverse pin or lug 37 to which is secured the upper end of a coil tension spring 38. The lower end of each spring 38 is connected to a downwardly projecting hook 39 having a threaded shank 40 on which is screw-threaded an adjustment nut 41. The shank 40 of each hook 39 extends through an opening in a bracket 42 that is riveted or otherwise rigidly secured to its respective one of the end frame members 9 and 10, the adjustment nuts 41 being screw-threaded against their respective brackets 42 to produce desired tension on the springs 38 to yieldingly urge the moveable conditioner roll 15 toward the fixedly journaled conditioner roll 16.

Means for limiting movement of the upper conditioner roll 15 toward its cooperating lower conditioner roll 16 comprises a pair of flat rectangular mounting plates 43 each welded to the rear surface of the transverse frame member 8 above a different one of the roll mounting arms 23 and 24; a pair of pads 44, and a pair of abutment members 45. Each of the mounting plates 43 is provided with a plurality of rearwardly projecting studs 46 on spaced pairs of which are mounted clamping bars 47. As shown particularly in FIGS. 4 and 5, the clamping bars 47 overlie opposite end portions of the pads 44, clamping nuts 48 being screw-threaded on the studs 46 to exert clamping pressure of the clamping bars 47 against the underlying end portions of the pads 44.

The pads 44 each comprise an elastic pad portion 49 disposed in face-to-face engagement with a respective one of the mounting plates 43, and one or more metallic shims 50 overlying the rear surface of the elastic portion 49, the clamping bars 47 engaging opposite end portions of the outermost shim 50.

Each of the abutment members 45 comprises a plate-like pad-engaging section 51 that is adapted to have face-to-face engagement with the outermost shim 50 of its respective pad 44, and a mounting flange 52 extending rearwardly from the pad-engaging section 51. Each flange 52 is rigidly but releasably mounted on the upper end of an adjacent one of the mounting arm sections 26, by means of a nut-equipped machine screw or bolt 53.

Weight of the upper conditioner roll 15, together with the yielding bias of the springs 38 urge the upper roll 15 toward engagement with the lower conditioner roll 16; and engagement of the pads 44 by the abutment members 45 limits movement of the moveable conditioner roll 15 toward its cooperating roll 16. A predetermined minimum spacing or operative clearance between the rolls 15 and 16 is obtained by adding one or more shims 50 to each pad 44, or by removing shims 50 therefrom. When any change is made in the working clearance between the conditioner rolls 15 and 16 by changing the number of shims 50, the abutment elements 45 are pivotally adjusted on their respective arm sections 26 so that the pad-engaging sections 51 lie flat against their respective outermost shims 50.

During operation of the swather in a field, heavy or thick clumps of crop material, such as hay, cut by the cycle-bar mower 12, are often thrown upwardly and rearwardly to the conditioner rolls 15 and 16 by the reel 13. These heavier clumps of cut crop force upward movement of the upper roll 15 away from the roll 16, against bias of the springs 38. Then, when the clumps pass rearwardly of the rolls 15 and 16, the springs 38 as well as the force of gravity swing the arms 23 and 24 downwardly toward engagement of the rolls 15 and 16. The abutment members 45 strike their respective pads 44, the elasticity of the elastic portions 49 cushioning the impact of the abutment members 45 against their respective pads 44 to minimize shock loads of the shocked portions 21 against their respective bearings 22, and also minimize the noise associated with the impact of the abutment members 45 against their respective pads 44.

In view of the fact that the rear portions of the arms 23 and 24, the radial arm 31, anchoring arm 33, pads 44 and parts associated therewith, are all at the rear portion of the frame 1, and of easy access to the operator, all of the necessary adjustments can be made quickly and easily and without disassembly of any portion of the machine from the frame 1.

While I have shown and described a commercial embodiment of the improvements of this invention, it will be understood that the same is capable of modification without departure from the spirit and scope of the invention, as defined in the claims.

What is claimed is:

1. In a mower and hay conditioner structure:
   a. a mobile frame including an elongated transverse frame member and a pair of end frame members spaced apart longitudinally of said transverse frame member and extending generally parallel to the direction of travel of the frame;
   b. a pair of parallel upper and lower conditioner rolls having opposite ends disposed adjacent said end frame members, one of said rolls being journaled in said end frame members on a generally horizontal axis;
   c. means mounting the other of said rolls for rotation with said one of the rolls and for movements in opposite directions toward and away from said one of the rolls and including a pair of crank arms;
   d. arm mounting means pivotally mounting said crank arms on said end frames on axes parallel to the axes of said rolls;
   e. and means limiting pivotal movements of said arms in the direction of movement of said other roll toward said one of the rolls and including;
      1. a pair of abutment members each mounted on a different one of said arms;
      2. and a pair of pads each mounted on said frame in the path of movement of a different one of said abutment members, said pads including elastic portions disposed to cushion the impact of said abutment members against said pads.

2. The mower and conditioner structure defined in claim 1, characterized by yielding means secured to said arms and frame members and urging said other one of the rolls in a direction toward said one of the rolls.

3. The mower and conditioner structure defined in claim 2 in which said arm mounting means includes a pair of eccentric elements one for each of said crank arms, said eccentric elements being rotatable to move the axis of rotation of each crank arm in directions to impart movement to said other one of the rolls in generally forward and rearward directions tangentially of said one thereof, and locking means for releasably locking said eccentric elements in desired set positions of rotation thereof.

4. The mower and conditioner structure defined in claim 3 in which said locking means includes a pair of radial arms each secured to a different one of said eccentric elements, a pair of locking arms each pivotally secured to said frame, and a locking connection between each radial arm and a different one of said locking arms and adjustably locking one of said radial and locking arms in set positions longitudinally of its respective arm.

5. The mower and conditioner structure defined in claim 3 in which said abutment members are mounted on their respective arms for limited pivotal movement on axes generally parallel to the axis of said other one of the rolls, characterized by means for releasably locking said abutment members in set positions of said pivotal movement.

6. The mower and conditioner structure defined in claim 3 in which said abutment members define flat faces for face-to-face engagement with said pads, each of said pads including at least one shim plate disposed in overlying face-to-face relationship with its respective elastic portion for engagement with a respective one of said abutment members.

7. The mower and hay conditioner structure defined in claim 1 in which said frame member includes a pair of longitudinally spaced generally vertical mounting plates facing rearwardly of the frame, said elastic pad portions each being disposed in face-to-face engagement with the rear surface of a different one of said mounting plates, said pads each including at least one metallic shim plate overlying its respective elastic portion, characterized by anchoring means for releasably holding said pads on said mounting plates.

8. The mower and conditioner structure defined in claim 7 in which said anchoring means comprises a pair of laterally spaced clamping members overlying spaced portions of each of said pads, each of said clamping members having opposite end portions projecting laterally outwardly of opposite edges of their respective pads, and nut-equipped anchoring studs projecting rearwardly from said mounting plates and projecting through openings in said opposite end portions of the clamping members.

* * * * *